US008589860B2

(12) United States Patent
Zhang et al.

(10) Patent No.: US 8,589,860 B2
(45) Date of Patent: *Nov. 19, 2013

(54) METHOD AND APPARATUS FOR USING SERVICE REPRESENTATIONS TO ALIGN INFORMATION TECHNOLOGY WITH THE STRATEGY OF AN ENTERPRISE

(75) Inventors: Liang-Jie Zhang, Cortlandt Manor, NY (US); Hong Cai, Haidian District Beijing (CN); Jen-Yao Chung, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/444,830

(22) Filed: Apr. 11, 2012

(65) Prior Publication Data

US 2012/0209779 A1     Aug. 16, 2012

Related U.S. Application Data

(63) Continuation of application No. 12/062,819, filed on Apr. 4, 2008, now Pat. No. 8,219,967, which is a continuation of application No. 11/187,838, filed on Jul. 25, 2005, now abandoned.

(51) Int. Cl.
*G06F 9/44*     (2006.01)

(52) U.S. Cl.
USPC ........................... 717/102; 717/103; 717/120

(58) Field of Classification Search
USPC ........... 717/102–103, 120–123; 709/203–204
See application file for complete search history.

(56) References Cited

U.S. PATENT DOCUMENTS

| | | | | |
|---|---|---|---|---|
| 6,424,991 | B1 * | 7/2002 | Gish | 709/203 |
| 7,020,869 | B2 * | 3/2006 | Abrari et al. | 717/108 |
| 7,500,224 | B2 * | 3/2009 | Hejlsberg et al. | 717/122 |
| 7,703,123 | B2 * | 4/2010 | Vail et al. | 726/1 |
| 7,757,210 | B1 * | 7/2010 | Krueger | 717/120 |
| 7,849,438 | B1 * | 12/2010 | Hemmat et al. | 717/102 |
| 7,873,940 | B2 * | 1/2011 | Sanghvi et al. | 717/102 |
| 7,930,681 | B2 * | 4/2011 | Kloeffer et al. | 717/120 |
| 7,958,494 | B2 * | 6/2011 | Chaar et al. | 717/121 |
| 7,996,814 | B1 * | 8/2011 | Qureshi et al. | 717/120 |
| 8,001,527 | B1 * | 8/2011 | Qureshi et al. | 717/120 |

(Continued)

OTHER PUBLICATIONS

Roy, "Towards End-user Enabled Web Service Consumption for Mashups", ACM, pp. 413-146, 2010.*

(Continued)

*Primary Examiner* — Anil Khatri
(74) *Attorney, Agent, or Firm* — Whitman, Curtis, Christofferson & Cook, P.C.; Daniel P. Morris

(57) ABSTRACT

A service-oriented architecture for enterprise project management integrates business processes, human resources and project management within an enterprise or across the value chain network. A representation having direction and attributes is provided to show the dependencies between a business value layer and a project-portfolio layer, and between the project-portfolio layer and resources. The representation is mapped to a Web Services representation in UDDI, Web Services interfaces, and Web Services based business processes through rope hyper-linking.

19 Claims, 10 Drawing Sheets

(56) References Cited

U.S. PATENT DOCUMENTS

| | | | | |
|---|---|---|---|---|
| 8,069,437 | B2 * | 11/2011 | Aigner et al. | 717/109 |
| 8,122,426 | B2 * | 2/2012 | Isom | 717/103 |
| 8,296,718 | B2 * | 10/2012 | Appleyard et al. | 717/102 |
| 8,341,595 | B2 * | 12/2012 | Arner et al. | 717/109 |
| 8,359,566 | B2 * | 1/2013 | Chaar et al. | 717/101 |
| 8,370,188 | B2 * | 2/2013 | Bernardini et al. | 705/7.13 |
| 8,438,541 | B2 * | 5/2013 | Abrams et al. | 717/120 |
| 8,448,137 | B2 * | 5/2013 | Kaetker et al. | 717/121 |

OTHER PUBLICATIONS

Santos et al, "Utilizing cross-domain SOAP web services using clientside languages in an Enterprise Mashup Platform", ACM, pp. 1-4, 2009.*

Thirumaran et al, "A Novel Framework for Enterprise Web Services Change Management", ACM, pp. 21-27, 2012.*

Mokarizadeh et al, "Evaluation of a Semi-Automated Semantic Annotation Approach for Bootstrapping the Analysis of Large-scale Web Service Networks", IEEE, pp. 388-395, 2011.*

* cited by examiner

Table 1 Example High-level EPM Flow in BPEL

```
                  <process name="productDevProcess"
<process name="productDevProcess"
    targetNamespace="http://ws-epm.com/ws-bp/ws-epm"
    xmlns="http://schemas.xmlsoap.org/ws/2003/03/business-process/"
    xmlns:lns="http://ws-epm.org/wsdl/ws-epm">
 <sequence>
  <receive partnerLink="Customers"
      portType="lns:ws-epmPT"
      operation="sendBusinessRequirements"
      variable="BusinessRequirements">
  </receive>

<flow>
    <sequence>
      <invoke portType="lns:InitializationPT"
           operation="requestInitialization"
      </invoke>

<invoke portType="lns:PlanningPT"
           operation="requestPlanning"
      </invoke>

<invoke portType="lns:ExecutingPT"
           operation="requestExecuting"
      </invoke>

<invoke portType="lns:Monitoring-ControllingPT"
           operation="requestMonitoring-Controlling"
      </invoke>

<invoke portType="lns:SummarizingPT"
           operation="requestSummarizing"
      </invoke>
    </sequence>
  </flow>

<reply partnerLink="Customers"
      portType="lns:ws-epmPT"
      operation="sendBusinessRequirements" />
 </sequence>
</process>
```

Figure 8

Table 2 Example WSDL Using WSResource for Defining WS-EPM Resources

```
                <wsdl:definitions ... xmlns:tns="http://ws-epm.com/productDevBP" ...>...
<wsdl:definitions ... xmlns:tns="http://ws-epm.com/productDevBP" ...>...
<wsdl:types>
<xsd:schema targetNamespace="http://ws-epm.com/productDevBP" ... >
<!-- Resource property element declarations -->
<xsd:element name="NameofProduct" type="xsd:string" />
<xsd:element name="NumberOfTeam" type="xsd:integer"/>
<xsd:element name="TeamSize" type="xsd:integer" />
<xsd:element name="ProductManager" type="xsd:string" />
<xsd:element name="StartTime" type="xsd:string" />
<xsd:element name="ReleaseTime" type="xsd:string" />

<!-- Resource properties document declaration -->
<xsd:element name="GenericProductDevBPProperties">
<xsd:complexType>
<xsd:sequence>
<xsd:element ref="tns:NameofProduct"/>
<xsd:element ref="tns:NumberOfTeam"/>
<xsd:element ref="tns:TeamSize" />
<xsd:element ref="tns:ProductManager" />
<xsd:element ref="tns:StartTime" />
<xsd:element ref="tns:ReleaseTime" />
<xsd:any minOccurs="0" maxOccurs="unbounded" />
</xsd:sequence>
</xsd:complexType>
</xsd:element>
...
</xsd:schema>
</wsdl:types>
...
<!-- Association of resource properties document to a portType -->
<wsdl:portType name="GenericProductDevBP"
wsrp:ResourceProperties="tns:GenericProductDevBPProperties" >
<operation name="start" .../>
<operation name="monitor" .../>
<operation name="reschedule" .../>
<operation name="change-management" .../>
<operation name="stop" .../>
...
</wsdl:portType>
...
</wsdl:definitions>
```

*Figure 9*

Table 3 Request of Accessing WS-EPM Resource Properties

...
```
<wsrp:GetMultipleResourceProperties
xmlns:tns="http://ws-epm.com/productdev" ...>
<wsrp:ResourceProperty>tns:NameofProduct</wsrp:ResourceProperty>
<wsrp:ResourceProperty>tns:ProductManager</wsrp:ResourceProperty>
<wsrp:ResourceProperty>tns:ReleaseTime</wsrp:ResourceProperty>
</wsrp:GetMultipleResourceProperties>
```
...

*Figure 10*

Table 4 Response of Accessing WS-EPM Resource Properties

...
```
<wsrp:GetMultipleResourcePropertiesResponse
xmlns:ns1="http://ws-epm.com/productdev" ...>
<ns1:NameofProduct>WS-EPM Sphere</ns1:NameofProduct>
<ns1:ProductManager>Liang-Jie Zhang</ns1:ProductManager>
<ns1:ReleaseTime>06/01/2004</ns1:ReleaseTime>
</wsrp:GetMultipleResourcePropertiesResponse>
```
...

*Figure 11*

METHOD AND APPARATUS FOR USING SERVICE REPRESENTATIONS TO ALIGN INFORMATION TECHNOLOGY WITH THE STRATEGY OF AN ENTERPRISE

REFERENCE TO RELATED APPLICATION

This application is a continuation from U.S. patent application Ser. No. 12/062,819 of the same title filed on Apr. 4, 2008 now U.S. Pat. No. 8,219,967, which is a continuation from U.S. patent application Ser. No. 11/187,838 of the same title filed on Jul. 25, 2005 now abandoned, from both of which priority is claimed and which are incorporated by reference herein.

BACKGROUND OF THE INVENTION

1. Field of the Invention

The present invention generally relates to project management and, in particular, to techniques for aligning information technology with the strategy of an enterprise.

2. Background Description

Today a lot of enterprises face the same common challenges: significant changes of market environment, pressure from competitors, changing customer requirements, regulation issues, disruptive technologies, and the like. Business practice development normally goes through the following steps: Strategic Change→Defining business requirements→Projects→Project Portfolio→Decision.

Possible changes under business transformation include: change of site (location), change of regulation (depending on geography), change of business model & customer requirements, change of business eco-system, and so forth.

In the current business environment, Enterprise Project Management (EPM) will have a positive impact on a number of concerns of the Chief Information Officer (CIO) of the enterprise. In particular, CIO's cite such concerns as: (1) cutting/stabilizing costs, (2) aligning information technology (IT) investments with business direction, (3) building strong IT service delivery, (4) selective outsourcing, offshore outsourcing and balancing of external service providers, (5) management of internal and external resources, (6) systems integration (e.g. Web-based systems, legacy systems, B2B systems), (7) building credibility for the value of IT's services, (8) prioritizing IT investments and formalizing the planning process, (9) security, including disaster recovery and business resumption planning, and (10) enterprise architecture.

All the changes will be realized through ongoing projects within an enterprise. The implementation of an IT project is actually realized through Project Management methodologies. Project management has always been a very important function in an organization. It has been used in various domains and industries such as aircraft design, software development, services delivery, solution development, as well as government programs. Life cycle of each project includes initialization, planning, execution, monitoring and controlling, and summarizing.

We summarize all these problems into the following statement: how can we integrate business requirement data, project data, project progress, resources information all into a single system so that the decision maker is able to monitor progress in real time and make decisions promptly in a managed environment with visibility control?

In fact, bridging the gap between business and IT has been a well known and challenging topic for years. By providing a standard interface description language and communication protocol, Web services has become the most promising technology to address the integration issue in different platforms or different programming environments. Therefore, it would be helpful to extend the usage of Web services technology from an IT-level computing environment to EPM for managing the enterprise project portfolio. IT can play a key role in enabling business transformation if it is aligned with the strategy of an enterprise.

Enterprise portfolio management is evolving today. It has sometimes been called "the third epoch" in the evolution of investment management procedures in public- and private-sector organizations. An enterprise involves an amalgamation of interdependent resources (including people, processes, facilities, and technologies) organized to obtain a strategic advantage in support of mission or business objectives. The decision makers in an enterprise must take the investment options and its affects associated with specific programs or projects.

META group defines EPM (enterprise program management) as "a holistic view of the coordination, oversight, and portfolio management of all programs/projects within the enterprise". The major concerns about the EPM are "the integration of planning, strategy, resource allocation, and architecture management to achieve the best value to the enterprise". Gartner group also call it Project Portfolio Management (PPM).

In this disclosure, Enterprise Project Management (EPM) covers both the project management aspect and the portfolio management aspect. So in the description that follows the term EPM will be used to represent Enterprise Portfolio Management as well.

SUMMARY OF THE INVENTION

It is therefore an object of the present invention to provide a method for aligning IT with the strategy of an enterprise.

This disclosure presents a new service-oriented architecture for enterprise project management that integrates business processes, human resources and project management within an enterprise or across the value chain network. Specifically, this invention includes a "rope" based representation method to show the dependencies between Business Value & Portfolio, and between Portfolio & Resources. A rope has direction, and several attributes. In addition, the present invention includes a mechanism to map the intuitive "rope" representation to Web Services representation in Universal Description, Discovery and Integration (UDDI) registry format, Web Services interfaces, and Web Services based business processes through rope hyper-linking. A rope represents an influence from one element to another one. Attributes could be assigned to this relationship binding rope.

Prior art solutions require project managers to submit resource requirements separately. This delays the handling of resource requirements until a later time. The enterprise's lack of a global view of projects are doing optimization based on each individual project. With a global view, the present invention can perform global optimization and enable more effective and productive decisions. Prior art solutions can not provide this capability.

This disclosure presents a service-oriented framework for enterprise project management, followed by a set of examples that use a Web Services (WS) Resource (WSResource) specification to capture the resources in WS-EPM environments, and using Business Process Execution Language (BPEL) to capture various operations during project execution.

One aspect of the invention is an architecture for project management of an enterprise. This architecture comprises a Web Services stack, which is in turn made up of a transport layer, a messaging layer, a description layer, a quality of experience layer, and a service composition layer. The architecture also provides for a business activity integration layer, which is added to the Web Services stack. Further, there is a Web Services Enterprise Project-Portfolio Management (WS-EPM) specification in the business activity integration layer, and the WS-EPM specification further comprises WS-EPM resources, WS-EPM operations and WS-EPM utilities. The WS-EPM resources provides a uniform service representation for resources applied to WS-EPM operations, and the WS-EPM utilities apply enterprise management criteria to WS-EPM operations, thereby aligning management of the enterprise with WS-EPM operations.

Another aspect of the invention is a method for project management of an enterprise that uses a rope metaphor, having direction and attributes, to represent dependencies between a business value layer and a project-portfolio layer, and dependencies between the project-portfolio layer and a resources layer, as a rope having direction and attributes. This method maps these representations to a Web Services representation using UDDI (Universal Description, Discovery and Integration) format and WSResource properties language. The Web Services representation uses an enhanced Web Services Stack having as an additional layer a Web Services Enterprise Project-Portfolio Management (WS-EPM) specification.

BRIEF DESCRIPTION OF THE DRAWINGS

The foregoing and other objects, aspects and advantages will be better understood from the following detailed description of a preferred embodiment of the invention with reference to the drawings, in which:

FIG. 8 is a table giving an example of high level EPM flow in a Business Process Execution Language (BPEL).

FIG. 9 is a table giving an example of a Web Services Definition Language (WSDL) using Web Services Resources (WSResources) for defining WS-EPM resources.

FIG. 10 is a table showing a request accessing WS-EPM resource properties.

FIG. 11 is a table showing a response to the request shown in FIG. 10.

DETAILED DESCRIPTION OF A PREFERRED EMBODIMENT OF THE INVENTION

Figure 1:
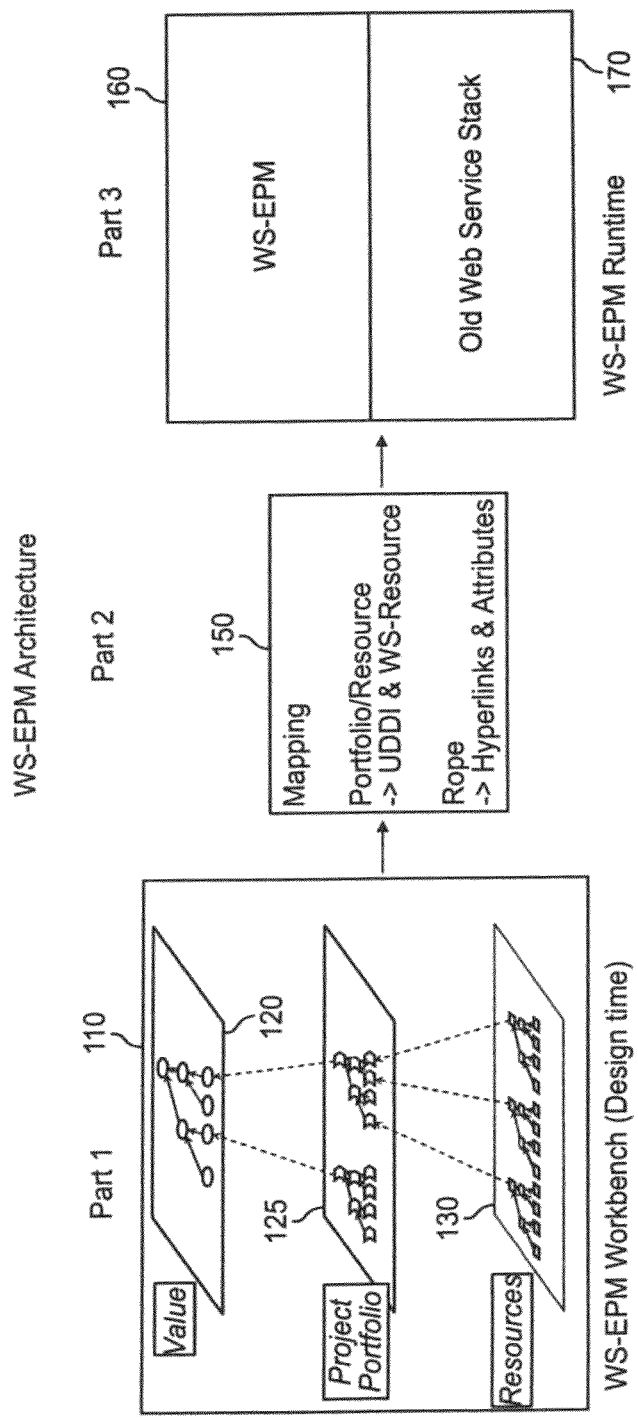
FIG. 1 is a diagram showing the Web Services Enterprise Project Management (WS-EPM) architecture of the invention.

The present invention consists of three major parts, as shown in FIG. 1:

Part 1 is a WS-EPM workbench 110 used at design time for simulating and adjusting the relationship between "Business Value" 120, "Project-Portfolio" 125, and "Resources" 130. The WS-EPM workbench 110 will use a very intuitive and innovative "rope" based representation to show the dependencies between Business Value & Portfolio (rope_A, decide value of projects) and Portfolio & Resources (rope_B, decide cost of projects) rope has direction, and several attributes. Examples include the following:

Revenue (value) may be achieved by online integration of several key projects (in portfolio)

One project (e.g. solution project) may depend on readiness of another project (e.g. infrastructure project)

A project depends on resources with different kinds of skill

Projects may compete with each other for same kind of resources at the same period A designer could change/simulate the dependencies by changing the length, strength, etc. of the ropes.

Part 2 is a mechanism 150 to map the intuitive "rope" representation to WS representation in UDDI, WS interface, WS based Business Process. A rope could correspond to a hyperlink. A rope represents an influence from one element to another one. Attributes could be assigned to a rope.

For the rope between Value→Portfolio, attributes include Time to market,

Value-add to IT maturity

Customer requirements

For the rope between Portfolio→Resource, attributes include

Budget,

Duration,

Resources required

Common resources (like Java™/C++ developer)

Resources with specific skills (like domain expert, platform expert, etc.)

The competition for the same key resource could be represented by ropes connected to the same resource type.

Part 3 is the runtime aspect of the invention and comprises the WS-EPM framework 160 based on WS-Resource Framework and BPEL4WS (BPEL for WS). In the WS-EPM framework, the project resources include business processes, skilled people, physical resources, control policies, and so forth. The project resources used in WS-EPM 160 are described by WSResource properties language. In addition, the coordination of project resources is guided by a set of operations modeled by Business Process Execution Language for Web Services (BPEL4WS). The WS-EPM framework 160 reflects a transformation of the old Web Services stack 170 as a result of mapping 150.

Experience in applying the EPM tool in the banking and electronics industries shows that through EPM customers can achieve:

IT alignment with business strategy for project management;

Saving cost through enterprise wide coordination;

Efficient use of resources and budget, shortening time to market; and

Visibility control.

Figure 2:
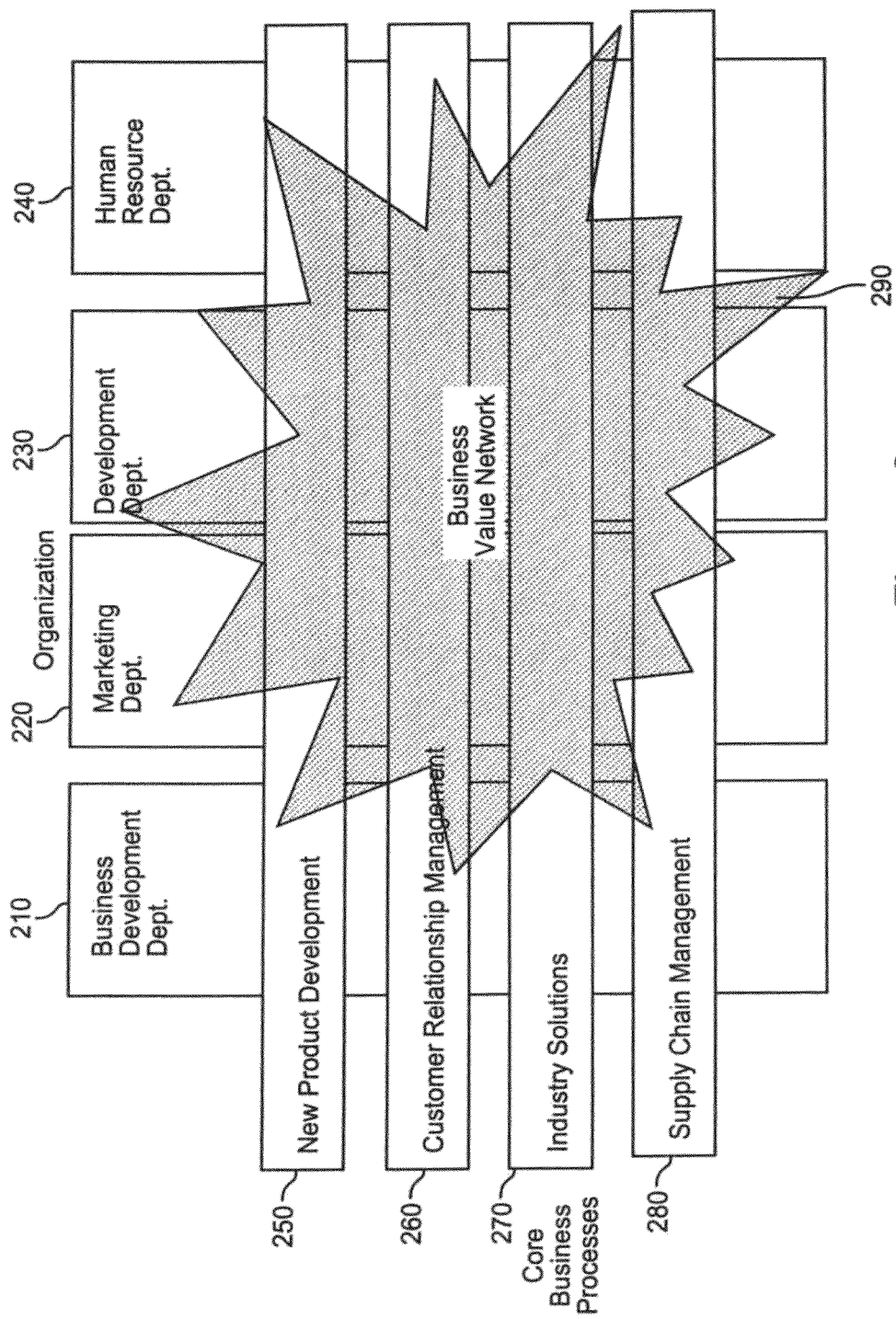
FIG. 2 is a diagram showing a business value network in an enterprise.

As shown in FIG. 2, an enterprise has multiple divisions or departments such as Business Development Dept. 210, Marketing Dept. 220, Development Dept. 230, and Human Resource Dept. 240. At the same time, some core business processes are executed across multiple organizations within the enterprise as well as outside of the enterprise. The typical business processes are New Product Development 250, Customer Relationship Management 260, Industry Solutions 270, and Supply Chain Management 280, among others (not shown). In today's enterprise, each organization is involved in multiple core business processes. In addition, a business process may interact with other business processes to form a business value network 290 shown in FIG. 2.

Figure 3:
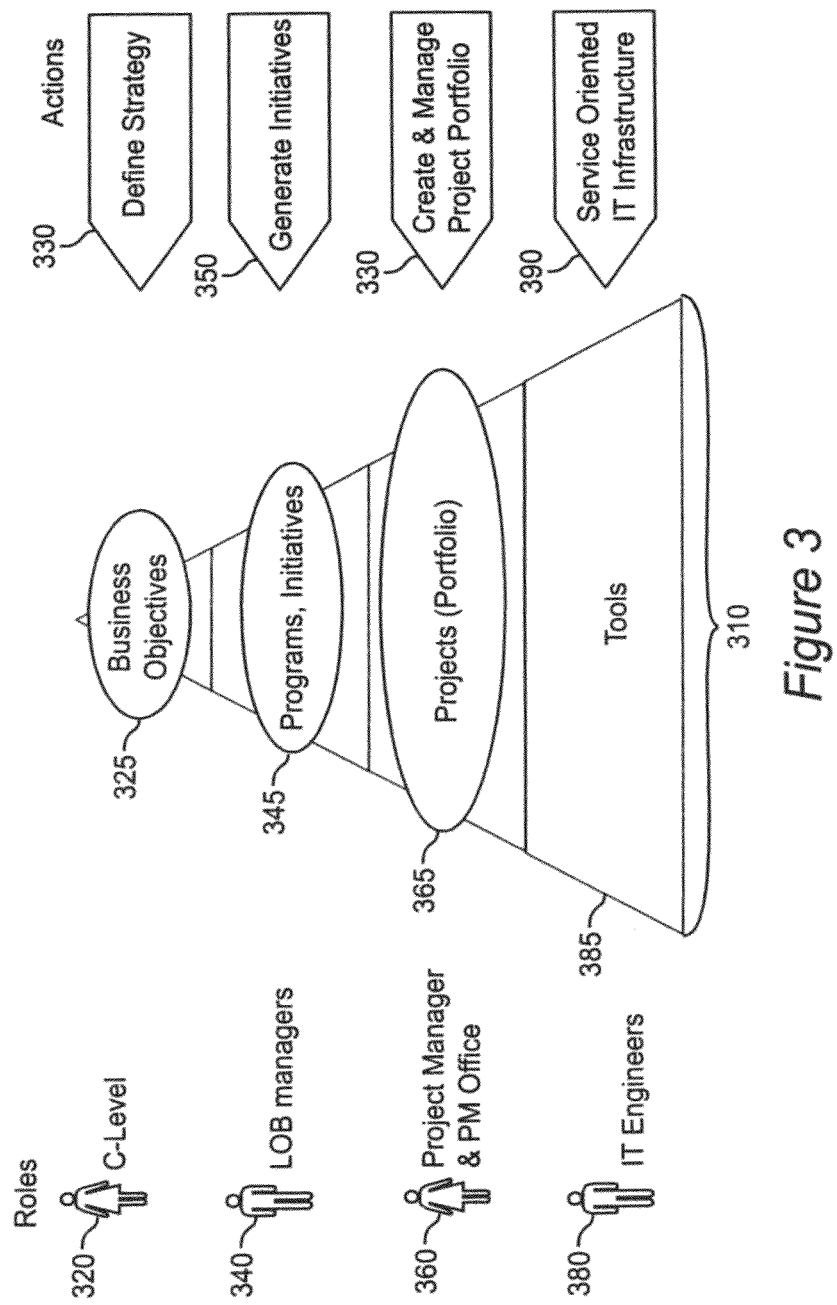
FIG. 3 is a diagram showing a service-oriented integrated project or portfolio management framework in accordance with the invention.

Based on the above operational view of the enterprise 310 that could often undergo changes because of changes of environment, an EPM (Enterprise Project/Portfolio Management) framework is shown in FIG. 3. The value network of EPM includes the corporate level management role 320 that is responsible for the business objectives 325 of the enterprise and acts to define business strategy 330, the line of business program management role level 340 that is responsible for programs and initiatives 345 implementing business objectives 325 and acts to generate initiatives 350, a program management role level 360 that is responsible for projects 365 implementing programs and initiatives 345 and acts to create and manage the project portfolio 370. The project portfolio is built from tools 385 provided by an IT engineer role level 380 characterized by actions providing a service oriented IT infrastructure 390. The invention uses Web services to capture the activities crossing different layers of EPM and then seamlessly communicate these to all the components in the value chain network (item 290 in FIG. 2).

There is no uniform way to capture the capabilities of each organization, business requirements for each core business process, representation of business processes or activities, delivery, schedule, and controlling policies in the business value network 290. In a project management lifecycle, all the resources are dynamically allocated based on the project goals, budgets, schedule, status, and exceptions. In one approach, each project is associated with an organization, which is located on a specific site. A project may have one or more tasks, which can be assigned to internal organization or outsourced to other organizations.

The difference between applying the concept of Web Services Resources (which originally comes from Grid Services in Open Grid Service Architecture) to EPM and applying it to original Grid Resource management lies in different types of resources. That is, under EPM circumstances, the resources are people, money, time, and the like, while Grid resources are memory, CPU, storage, etc. Therefore in EPM, resource allocation for a specific kind of resource is not only constrained by resource conflicts, but is also governed by business strategy (priority of different business objectives).

Figure 4:
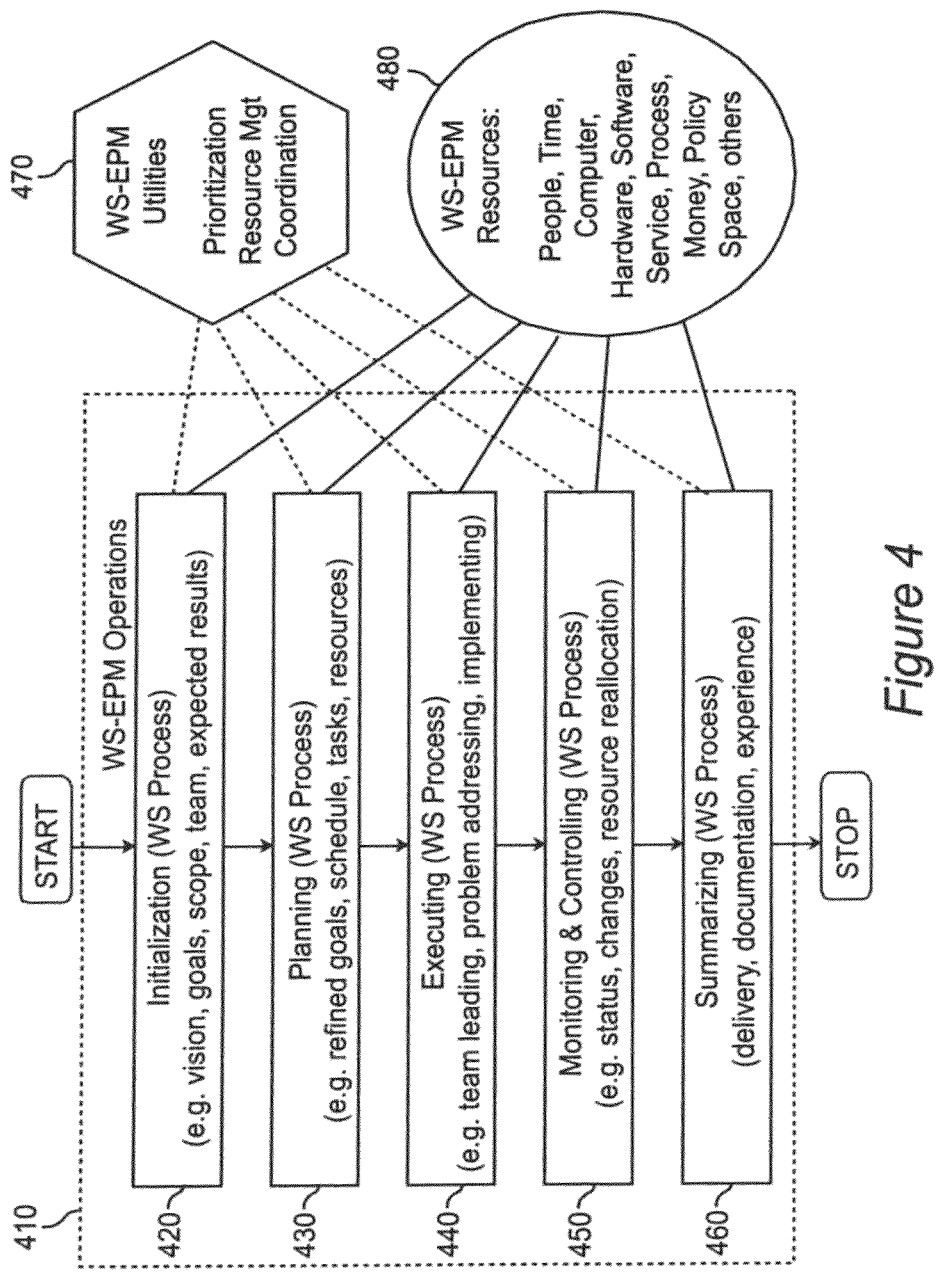
FIG. 4 is a diagram illustrating the invention's framework of Web Services for Enterprise Project Management (WS-EPM).

The basic idea of addressing this challenging issue is to "treat" all the components at the business level or IT level as "services", which can be captured and operated in a standard way. Therefore, a service-oriented integrated project or portfolio management framework provides a way of bridging the gap between business changes and IT realizations, as shown in FIG. 4, which illustrates the framework of Web Services for Enterprise Project Management (WS-EPM) in accordance with the invention. All the resources are captured in WSResource and all the operations or flows are captured in BPEL.

In WS-EPM, the resources may include (but are not limited to) people, time, computer, other hardware and software, services, money, spaces, and others. The discussion below illustrates how WSResource can be used to represent a process, an example resource defined in WS-EPM. By the same token, all the other resources also can be captured in WSResource properties language. In addition, the high-level enterprise EPM flow can be captured in BPEL as shown in FIG. 8 by Table 1. The high-level flow of EPM 410 starts from initialization process 420, planning process 430, then moves to executing process 440, monitoring and controlling process 450, and ends with summarizing process 460. These are all described as a Web Service Process and draw from WS-EPM Resources 480 that are uniformly expressed as services, under constraints provided by WS-EPM Utilities 470.

The initialization process 420 describes such elements of the enterprise as vision, goals, scope, team and expected results. In the project planning stage 430, the project goals and scope may be refined. A set of specific tasks or activities associated with a project should be outlined. The initial schedule and budget allocation should also be planned.

In the project executing stage 440, working with team to lead to project success is the most important goal. Along with this long-running process, problem solving (e.g. creating innovative technology to address a key solution problem) and project implementation are the two major activities.

Monitoring and controlling process 450 is the next important step for monitoring the status of project and business exceptions as well as taking actions such as resource allocation and invoking engineering change management.

The last step in a project lifecycle is summarizing process 460, which focuses on the final product or service delivery. At the same time, preparing documents and releasing allocated resources are important activities for closing a project successfully.

It should be emphasized that WS-EPM Resources 470 covers people, time, computer resources such as hardware and software, service standards, process limitations, money, policy requirements, available space and any other resources that go into EPM flow 410.

The BPEL shown in FIG. 8 as Table 1 models the high-level operations of WS-EPM as a system which takes business requirements as the input and generates new products or services as the response to the received business requirements. The sequential operations or services will be performed accordingly.

Figure 5:
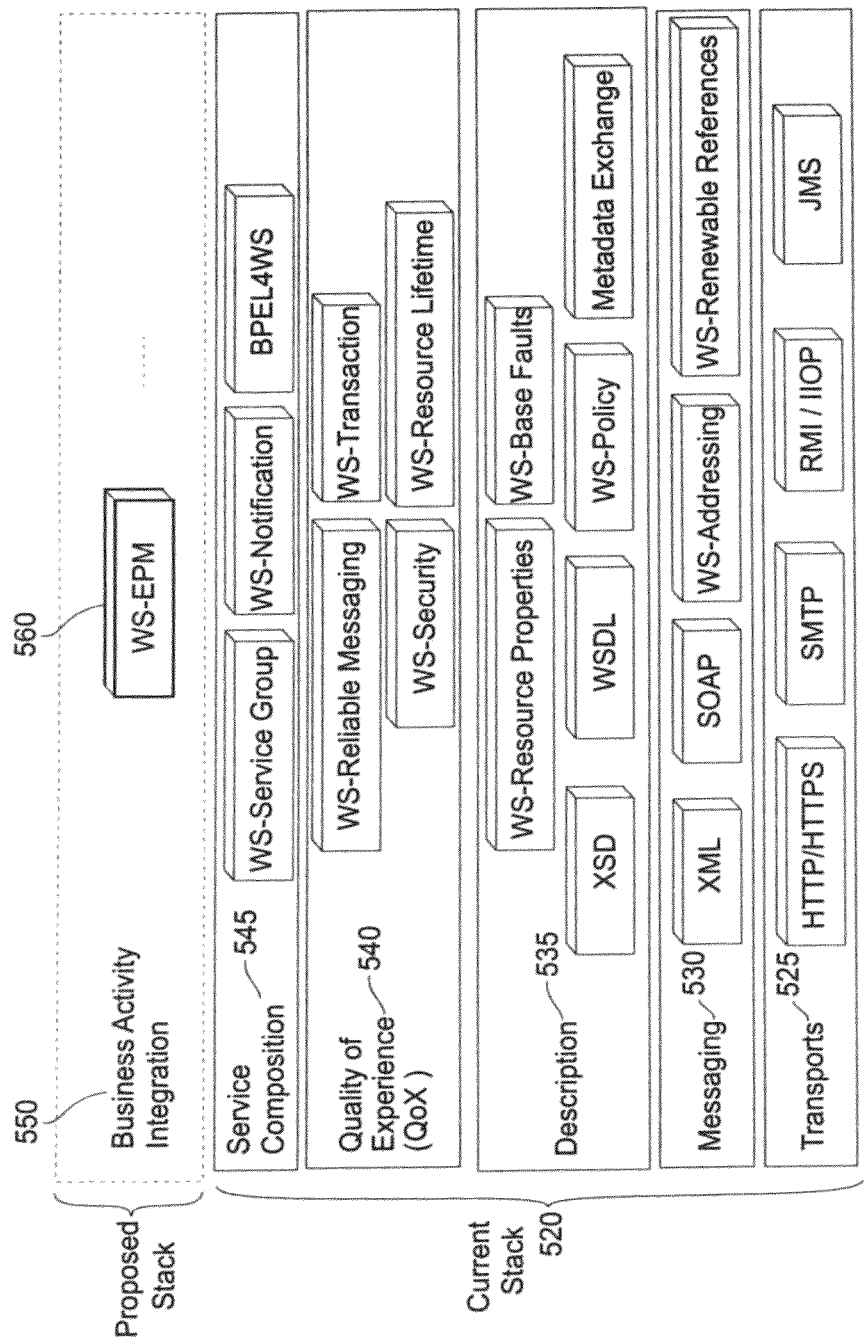
FIG. 5 is stack diagram showing the current Web Services Stack and a proposed WS-EPM Stack.

The current Web Services stack 520 shown in FIG. 5 includes the Transports layer 525, Messaging layer 530 (e.g. Simple Object Access Protocols (SOAP)), Description layer 535 (Web Services Definition Language (WSDL)), Quality of Experience (QoX) layer 540, and Service Composition layer 545 (e.g. Business Process Execution Language (BPEL4WS)). The other enabling infrastructure of Web Services consists of UDDI registries, Web Services Inspection Language (WSIL), and so forth (now shown). The current Web services standard stacks are more focused on the enabling infrastructure level. They cannot address the challenges and problems in the industry solution domain such as enterprise project management.

Therefore, the invention provides a new stack layer, Business Activity Integration 550, to provide a uniform integration framework for using Web Services to integrate business processes, people, and information in a standard way for enterprise project management. WS-EPM as developed in the present invention is an example integration specification at Business Activity Integration Layer in the future Web Services Standards stack.

As is evident from FIG. 5, WS-EPM leverages the existing Web services technology components such as WS-Resource and BPEL4WS to define the resources involved in EPM and describe key operations. The WS-EPM specification covers basic constructs in an Enterprise Project Portfolio Management system. Specifically, as shown in FIG. 4, the WS-EPM constructs cover three major parts: Resources 470, Operations 410, and Utilities 480.

As described above, WS-EPM Resources include people, time, computer resources, other hardware and software, services, money, spaces, and other resources. If a resource has different states that depend on time, location or other project attributes or contexts, we will use the term "stateful" to refer to that resource. The stateful resources used in WS-EPM can be represented in Web Services Resource Property language.

Since WSResource also provides a way to access the defined stateful resources in an enterprise, WS-EPM is a very good example of using WSRF in enterprise management. The beauty of WSResource is that it supports dynamic creation of resource properties and their values.

Internal and external resources will be registered, according to skill set, and put into a UDDI repository of WS-EPM. In the enterprise environment, there are some customized resources, which are described as follows.

Business components: A business component is a specific kind of service in operational environment of the enterprise, e.g. customer service, product manufacturing process, auditing and management process, and the like. Under business transformation, people from an enterprise may find that some existing business components could not provide the necessary function (Gap), or it has something redundant with another component (Overlap), or it is a completely new business component (New). Whatever the circumstances, a business component is required to be improved as a business initiative. As a result, a project will be established. The expected result of that project is to achieve some outcomes to influence one or multiple business components. It is the feature of outcome or influence on business components (e.g. whether it is urgent to be improved) that leads to a final decision regarding the sequence of a project within a project portfolio and how resources (people, budget) are allocated to those projects.

Business policy: It consists of certain business rules to make the project efficient, or something needed to be done in order to be compliant with the regulations.

Non-functional requirements, such as a Key Performance Indicator (KPI), which is a business performance index owned by some people in the enterprise and measured by their stakeholders: Compared with "what" can be done with a business component, non-functional requirements cover those concerns such as user friendliness, duration of the project, budget allocated, required skill set, etc. Non-functional requirements are usually directly linked with business strategy.

As an example, consider "Product Development Process" as a business component in an WS-EPM environment to define its properties. The association of the resource properties document with the portType defines the type of the WSResource, as shown in FIG. 9 by Table 2. It is noted that creating WSResource compatible WSDL files is not the main focus of the present invention. It is more important to identify the associated resources in the context of Web Services for Enterprise Project Management.

In WS-EPM, you can use a Web services call to discover all the resources related to EPM and the properties of the resources. For example, you can retrieve all the information about resources such as Product Development Business Process (ProductDevBP).

In the example shown in FIG. 10 as Table 3, we illustrate how to retrieve three resource property elements from the WS-Resource that implements the GenericProductDevBP portType. The corresponding response about the product development business process is shown as follows in FIG. 11 as Table 4. All the WSResource requests and responses will be encoded in SOAP messages. In addition, we can also easily set properties for the WS-EPM Resources by using SOAP encoding based communication mechanism.

The lifetime of WS-EPM resources can be monitored and managed. All the operations or actions such as GetResourceProperty, GetResourcePropertyResponse, GetMultipleResourceProperties, SetResourceProperties, QueryResourceProperties which are defined in WSResource can be directly used to set, update, and monitor WS-EPM Resources.

WS-EPM operations cover initialization, planning, executing, monitoring and controlling, and summarizing in the lifecycle of a project. As shown in FIG. 4, the project initialization process 420 will be used to set the initial vision, goals, team, expected results and scope for each project.

We will use a new product development project as an example. A project usually has different activities (or phases), e.g. Assessment, Requirement Definition, Macro Design, Micro Design, Development, Change Management, Auditing, etc. Usually activities within a project have inherent dependencies:

Sequential relationship: activity B must follow activity A

Resource sharing: activity B must wait until A release a resource instance X (e.g. a Java™ developer)

other dependencies that have been covered in WBS (Work Breakdown Structure) in a normal project management system There are different types of task dependencies such as finish to start, start to start, finish to finish, and start to finish. These types are modeled using a Web services flow language like BPEL.

There are several existing research efforts related to the dependency description in business process or web services, and some of these ideas could be leveraged in this WS-EPM framework.

The priority of a project depends on a number of factors, such as, tangible value (revenue), intangible value (like brand), scope of the project, required time to market, and factors deciding whether the project is suitable to be developed inside or outside (by outsourcing). As discussed above, priority of a project is related to value, cost, etc. They are used as criteria to guide the coordination of different projects. The Prioritization Web service (PWS) in WS-EPM framework will take these factors as input and perform project prioritization accordingly.

Let us take two example resources, people and budget, into consideration in an EPM system for resource management. These two resources are the factors that affect how the projects are managed and implemented, how we should balance the resources for a specific project to achieve an overall best performance. For example, resources can be firstly divided into internal resources (internal development) or external resources (by outsourcing). Internal resources can be organized into a large resource pool so that the whole enterprise can enjoy the cost saving brought by shared services. In the WS-EPM architecture of the invention, the Resource-Management Web service will take the current available resources as the input to perform optimal resource allocation.

Since resources are always limited and shared among different business units, it happens quite often that at the same time, different project activities require the same kind of skill set so that a resource conflict occurs.

The key factor influencing the resource conflict is resource dependencies among different project activities. We will demonstrate three ways to solve resource conflicts among projects in a portfolio according to their priority. The decision is up to the Project Management Office (PMO).

Here, we define a project portfolio (e.g. those projects supporting the function of same line of business) as PP; we define the number of projects in PP as N; we order the projects in PP such that $P_1$ has the highest priority and $P_N$ has the lowest priority. We assume that $P_1$ use M resource types ($R_1$, $R_2$, ... $R_M$). In order to perform project coordination, we use three Web services, namely ConflictTransferWS, RelaxResourceWS, and SearchResourceWS, to realize the following three approaches, respectively:

Approach 1 (ConflictTransferWS): Identify the conflicted resources in $P_1$, transfer these conflicts directly to other projects in PP;

Approach 2 (RelaxResourceWS): Relax the resources' requirements in $P_1$, e.g. by changing the project duration or FTE (Full Time Equivalent) and see if conflicts are diminished.

Approach 3 (SearchResourceWS): Go back to resource allocation operation, search substitute resources.

Figure 6:
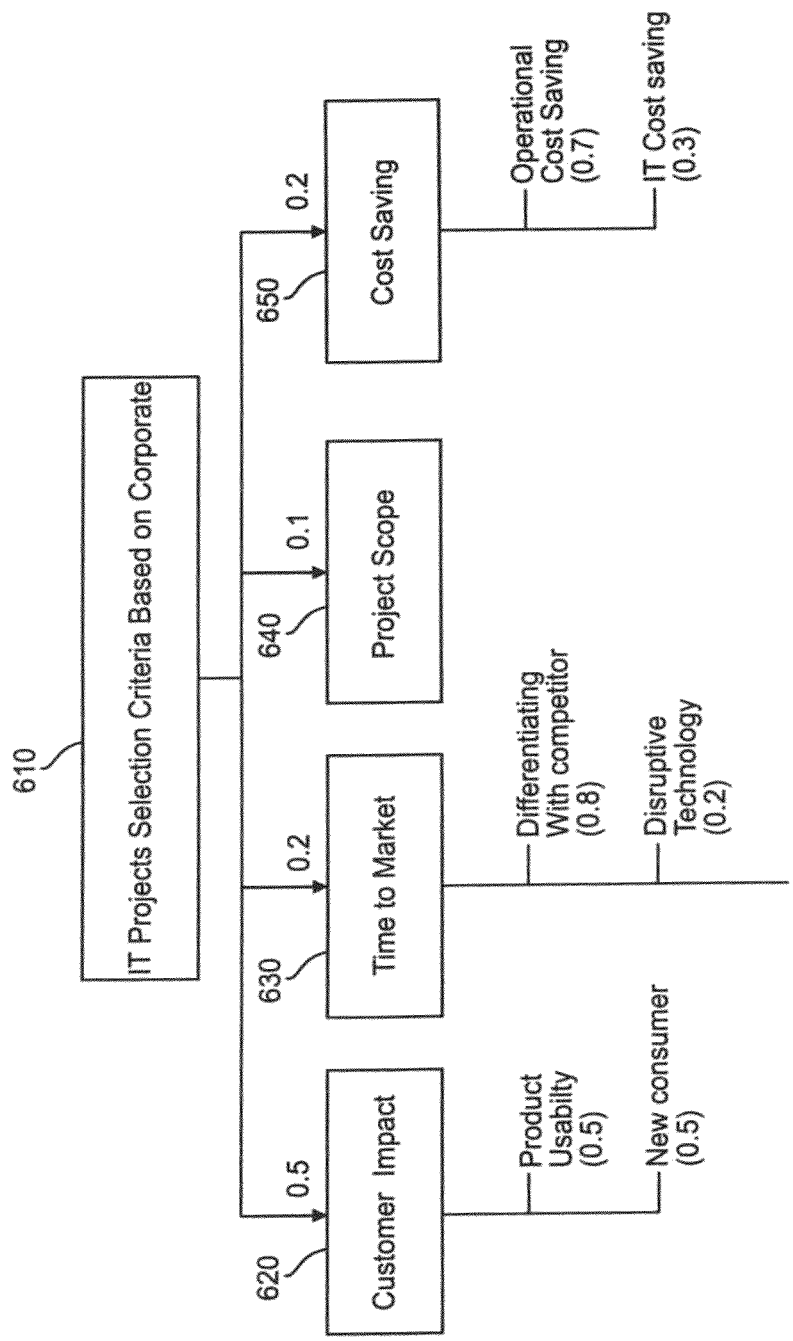
FIG. 6 is a diagram showing project prioritization based on business strategy.

We will now use an industry scenario to illustrate how WS-EPM is used to model resources, perform project prioritization, as well as resources management. After corporate level persons decide the strategy for an enterprise, a KPI tree representing the criteria for selecting projects 610 could be created, as shown in FIG. 6. An Analytical Hierarchy Process (AHP) method is used to decide project priority scores. The criteria for IT project selections 610 are based on the company's strategy. The weights for scoring the priorities for Customer impact 620, Time to market 630, Project scope 640, and Cost saving 650 are 0.5, 0.2, 0.1, and 0.2, respectively. The priorities for the customer impact aspect 620 is equally divided between product usability and attracting new customers. Similarly, the priority of Time to market 630 is mainly decided (0.8) by differentiating with competitors. For the Cost saving aspect 650, the operational cost saving has a higher priority (0.7) compared with IT cost saving whose priority is 0.3. The implementation of this method should be realized in the Prioritization Web service (PWS) in the WS-EPM framework.

Figure 7:
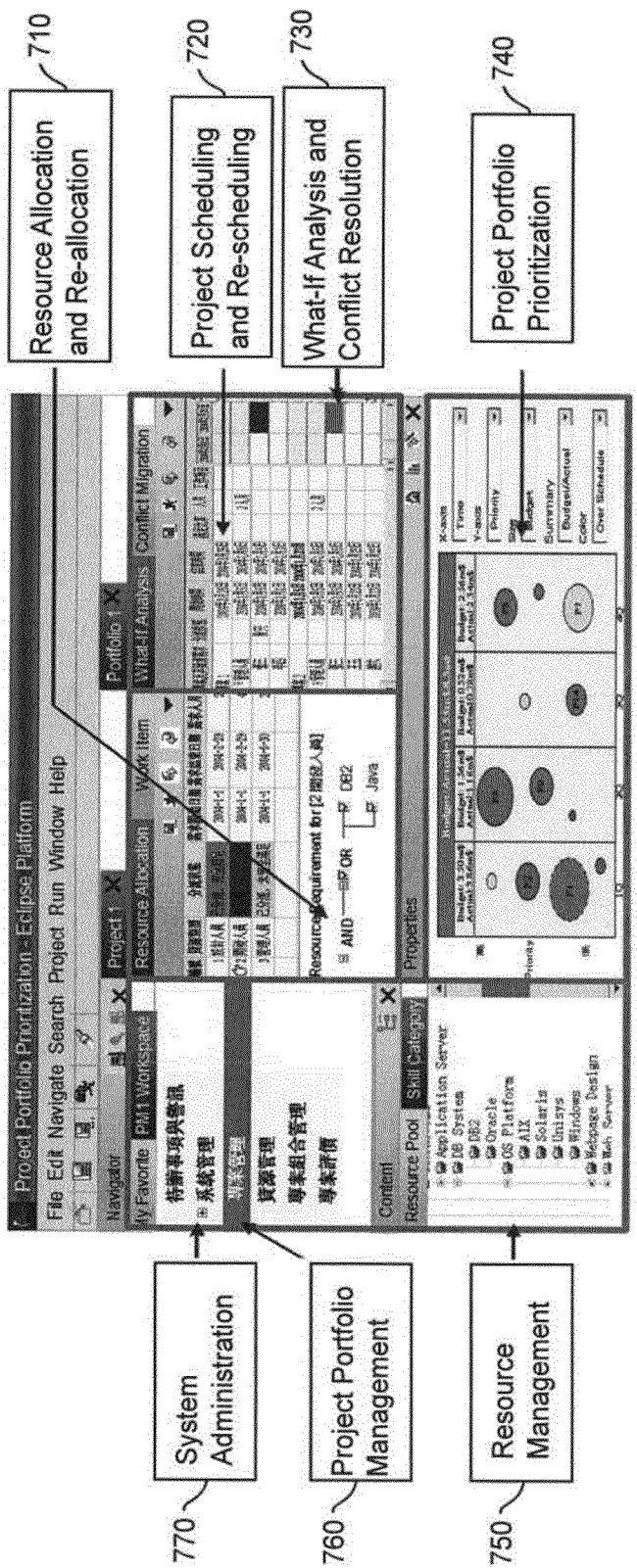
FIG. 7 is a screen image showing a snapshot of a project portfolio prioritization workbench implementing the enterprise project management framework of the invention.

FIG. 7 is a screen image giving a snapshot of an implementation of the invention illustrating the EPM framework. It supports resource allocation 710, conflict solving 720, project scheduling 730, portfolio prioritization 740, resource management 750, projection portfolio management 760, and system administration 770. The implementation shown in FIG. 7 is generated using Eclipse Modeling Framework (EMF), but other comparable tools may be used. Combining the power of Web Services, this implementation provides an extensible infrastructure for a fully working WS-EPM system.

Using this, we can register and find/bind project and resource information at run time. We can also create some higher-level APIs which are built on top of the above operations to simplify WS-EPM operations. For example, an operation named as WS-EPM-ProductDev-Operation is created to read and write property values to the ProductDev related resources. It hides the complexity of calling regular WSResource operations. Meanwhile, it provide a customized solution for WS-EPM by using the WSResource framework underneath.

A detailed operation procedure is illustrated as follows: (1) During design phase, projects will be registered, according to their impact on various business components, and according to their characteristics, which are represented as WS-EPM Resources; (2) During project execution, project activities and their interdependencies will be captured and monitored using BPEL4WS.

As described above, we have presented a new service-oriented architecture for enterprise project management, WS-EPM, which can integrate business process, human resources and project management within an enterprise or across the value chain network. Specifically, this invention includes a "rope" based representation method to show the dependencies between Business Value & Portfolio, Portfolio & Resources. A rope has direction, and several attributes. In addition, the present invention includes a mechanism to map the intuitive "rope" representation to a Web Services representation in UDDI, with Web Services interfaces, and Web Services based business processes through rope hyper-linking. A rope represents an influence from one element to another one. Attributes could be assigned to this relationship binding rope.

In the WS-EPM framework of the invention, the project resources include business processes, skilled people, physical resources, control policies, and so forth. The project resources used in WS-EPM are described by WSResource properties language. In addition, the coordination of project resources is guided by a set of operations modeled by Business Process Execution Language for Web Services (BPEL4WS). It can be seen how Web Services enabled Enterprise Project-portfolio Management may meld Web Services infrastructure into the critical EPM process and improve working efficiency and pave the way for continuous business transformation.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented representational architecture for project management of an enterprise, comprising:

a representation on the computer of a Web Services stack, said representation of the Web Services stack further comprising a transport layer, a messaging layer, a description layer, a quality of experience layer, and a service composition layer;

a representation on the computer of a business activity integration layer, added to said representation of the Web Services stack;

a representation on the computer of a Web Services Enterprise Project-Portfolio Management (WS-EPM) specification in said business activity integration layer, said representation of a WS-EPM specification further comprising WS-EPM resources, WS-EPM operations and WS-EPM utilities, wherein said WS-EPM resources provides a uniform service representation for resources applied to said WS-EPM operations, and said WS-EPM utilities apply enterprise management criteria to said WS-EPM operations, thereby aligning management of said enterprise with said WS-EPM operations.

2. An architecture as in claim 1, wherein said uniform service representation for resources is provided by WSResource properties language.

3. An architecture as in claim 1, wherein a design of said WS-EPM operations comprises a representation of dependencies between a business value layer and a project-portfolio layer, and a representation of dependencies between said project-portfolio layer and a resources layer.

4. An architecture as in claim 3, wherein said representations are hyperlinks having attributes.

5. An architecture as in claim 3, wherein said representations are mapped to said Web Services Stack using Universal Description Discovery and Integration (UDDI) registry format and WSResource properties language.

6. A computer implemented method for project management of an enterprise, comprising the steps of:

representing on the computer dependencies between a business value layer and a project-portfolio layer, and dependencies between said project-portfolio layer and a resources layer, as a rope having direction and attributes; and mapping said representations to a Web Services representation using UDDI (Universal Description, Discovery and Integration) format and WSResource properties language,
wherein said Web Services representation uses an enhanced Web Services Stack having as an additional layer a Web Services Enterprise Project-Portfolio Management (WS-EPM) specification.

7. A method as in claim 6, wherein said WS-EPM specification further comprises WS-EPM resources, WS-EPM operations and WS-EPM utilities.

8. A method as in claim 7, wherein said WS-EPM resources provides a uniform service representation for resources applied to said WS-EPM operations, and said WS-EPM utilities apply enterprise management criteria to said WS-EPM operations, thereby aligning management of said enterprise with said WS-EPM operations.

9. A method as in claim 8, wherein said uniform service representation for resources is provided by WSResource properties language.

10. A method as in claim 6, wherein said dependency representations are hyperlinks having attributes.

11. A method as in claim 6, wherein said dependency representations are mapped to said Web Services Stack using Universal Description Discovery and Integration (UDDI) registry format and WSResource properties language.

12. A computer implemented system for project management of an enterprise, comprising:
first computer code operable on the computer for representing dependencies between a business value layer and a project-portfolio layer, and dependencies between said project-portfolio layer and a resources layer, as a rope having direction and attributes; and
second computer code operable on the computer for mapping said representations to a Web Services representation using UDDI (Universal Description, Discovery and Integration) format and WSResource properties language,
wherein said Web Services representation uses an enhanced Web Services Stack having as an additional layer a Web Services Enterprise Project-Portfolio Management (WS-EPM) specification.

13. A computer implemented system as in claim 12, wherein said WS-EPM specification further comprises WS-EPM resources, WS-EPM operations and WS-EPM utilities.

14. A computer implemented system as in claim 13, wherein said WS-EPM resources provides a uniform service representation for resources applied to said WS-EPM operations, and said WS-EPM utilities apply enterprise management criteria to said WS-EPM operations, thereby aligning management of said enterprise with said WS-EPM operations.

15. A computer implemented system as in claim 14, wherein said uniform service representation for resources is provided by WSResource properties language.

16. A computer implemented system as in claim 12, wherein said dependency representations are hyperlinks having attributes.

17. A computer implemented system as in claim 12, wherein said dependency representations are mapped to said Web Services Stack using Universal Description Discovery and Integration (UDDI) registry format and WSResource properties language.

18. A computer implemented method for enterprise project management, the computer performing the steps of:
capturing on the computer resources of the enterprise in a resource properties language;
capturing on the computer operations of the enterprise in a business process execution language;
for each project undertaken by the enterprise, performing by the computer said operations in a particular sequence responsive to intrinsic connections between said operations and closing the project by releasing allocated resources;
wherein each of said operations in the particular sequence draws from said resources expressed as services and captured in said resource properties language, each of said operations being constrained by enterprise management criteria provided through enterprise utilities, and
wherein all said projects form a portfolio, and said drawing of resources is optimized across the portfolio according to a priority of said projects provided through said enterprise utilities.

19. A computer implemented method as in claim 18, wherein said particular sequence of operations is intrinsically connected as a project life cycle sequence further comprising the steps:
initialize the project by describing goals and expected results;
outline tasks associated with the project;
implement said tasks;
monitor a status of the project; and
summarize the product or service delivered by the project.

* * * * *